United States Patent
Bommer

(10) Patent No.: US 8,026,857 B2
(45) Date of Patent: Sep. 27, 2011

(54) WIRELESS DATA COMMUNICATION AND POWER TRANSMISSION USING AIRCRAFT STRUCTURES HAVING PROPERTIES OF AN ELECTROMAGNETIC CAVITY

(75) Inventor: Jason Philip Bommer, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 604 days.

(21) Appl. No.: 12/016,018

(22) Filed: Jan. 17, 2008

(65) Prior Publication Data

US 2009/0184877 A1    Jul. 23, 2009

(51) Int. Cl.
*H01Q 1/28* (2006.01)
(52) U.S. Cl. .......................... 343/708; 343/705
(58) Field of Classification Search .................. 343/708, 343/705
See application file for complete search history.

(56) References Cited

U.S. PATENT DOCUMENTS

| | | | | |
|---|---|---|---|---|
| 4,197,545 A | * | 4/1980 | Favaloro et al. | ........ 343/700 MS |
| 4,510,500 A | * | 4/1985 | Brune | ............................ 343/708 |
| 6,653,980 B2 | * | 11/2003 | Ceccom et al. | ................. 343/705 |
| 7,018,217 B2 | | 3/2006 | Marshall et al. | |
| 7,205,956 B1 | | 4/2007 | Sychaleum et al. | |
| 7,207,523 B2 | | 4/2007 | Callahan et al. | |
| 7,281,318 B2 | | 10/2007 | Marshall et al. | |
| 2004/0166408 A1 | | 8/2004 | Anderson et al. | |
| 2009/0108211 A1 | * | 4/2009 | Bommer et al. | ............... 250/395 |

FOREIGN PATENT DOCUMENTS

WO    WO2007041256 A2    4/2007

OTHER PUBLICATIONS

Bommer et al. U.S. Appl. No. 11/925,622, filed Oct. 26, 2007.
Hatfield et al., "Demonstration test of the electromagnetic reverberation characteristics of a transport size aircraft," NSWC Dahlgren Division, Report No. NSWCDD/TR-93/3.
Hill et al., "Aperture Excitation of Electrically Large, Lossy Cavities," IEEE Trans. On Electromagnetic Compatibility, vol. 36, No. 3, Aug. 1994.

* cited by examiner

*Primary Examiner* — David G Phan

(57) ABSTRACT

An aircraft structure having properties of an electromagnetic cavity is used to enhance wireless transmission for at least one of wireless data communication and wireless power transmission.

23 Claims, 5 Drawing Sheets

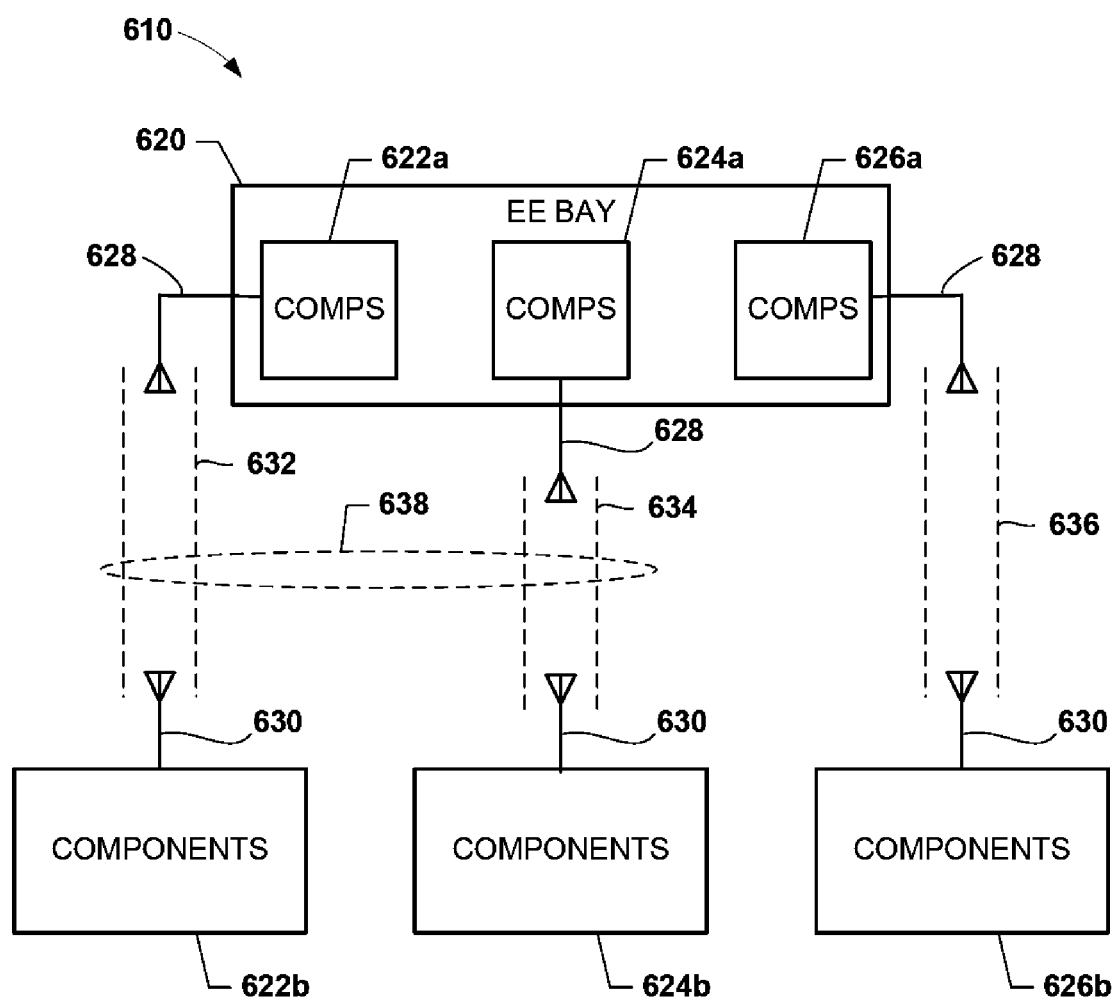

WIRELESS DATA COMMUNICATION AND POWER TRANSMISSION USING AIRCRAFT STRUCTURES HAVING PROPERTIES OF AN ELECTROMAGNETIC CAVITY

BACKGROUND

Copper wires are used in aircraft for data communications and power transmission. They are used by aircraft systems such as engine computers and flight controls.

However, copper wires add weight to an aircraft. Adding weight to an aircraft increases fuel consumption, which can increase aircraft operating costs. Adding weight to an aircraft also increases emissions.

Copper wires have other drawbacks. Installing copper wires throughout an aircraft adds a huge burden in terms of installation time and maintenance. In addition, reliability of electrical interconnects is an electromagnetic compatibility (EMC) concern. Over time, as interconnects degrade, they sometimes provide a source of unwanted radiation or a point of susceptibility. This can sacrifice system performance and become a source of electromagnetic interference (EMI).

SUMMARY

According to an embodiment of the present invention, an aircraft structure having properties of an electromagnetic cavity is used to enhance wireless transmission for at least one of wireless data communication and wireless power transmission.

BRIEF DESCRIPTION OF THE DRAWINGS

FIG. 6 is an illustration of a system in accordance with an embodiment of the present invention.

DETAILED DESCRIPTION

Figure 1:
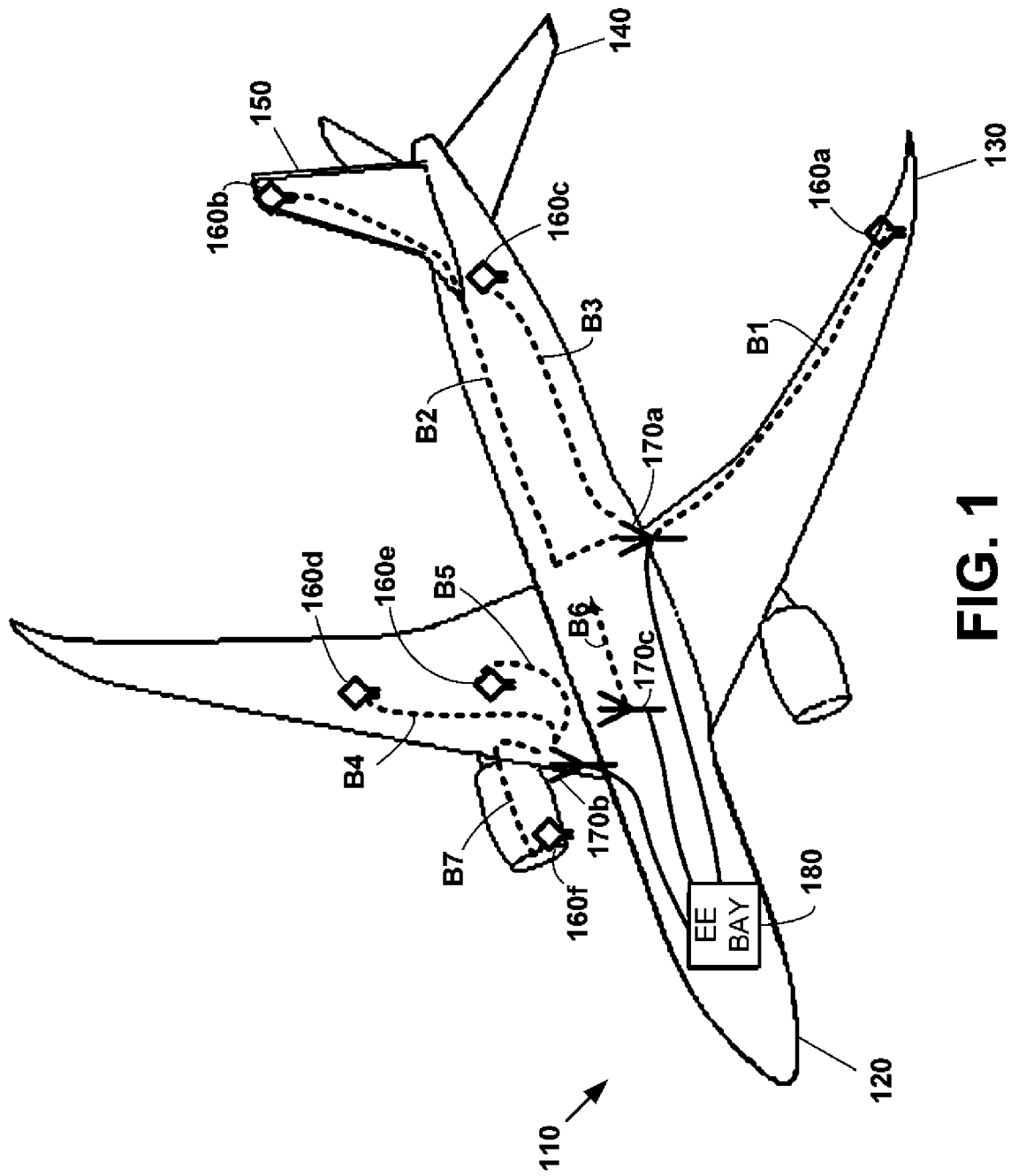
FIG. 1 is an illustration of an aircraft in accordance with an embodiment of the present invention.

Reference is made to FIG. 1, which illustrates an aircraft 110. The aircraft 110 includes a plurality of aircraft structures having properties of an electromagnetic cavity. Such structures, when excited at frequencies (e.g., 100 MHz to 100 GHz), may exhibit characteristics of fundamental mode waveguide propagation as well as higher-order resonant cavity modes. Electromagnetic radiation may be propagated from end-to-end of a structure as in an electromagnetic waveguide, or it may introduce a standing wave, such as with a cavity resonator.

These aircraft structures are electrically conductive and they have cavities, but they are not limited to any particular geometry or composition. The composition could include metal (e.g., aluminum, titanium, alloys thereof), composite material (e.g., carbon fiber reinforced plastic), or other electrically conductive material. These structures could even include non-conductive material having a surface that is covered with conductive material (e.g., electrically conductive paint, electrically conductive plating, a layer of conductive composite material, foil, mesh, and appliqué).

Aircraft structures include primary airframe structural elements such as skins, stiffeners, frames, ribs, beams, stringers, panels, spars, leading and trailing edges, control surfaces, etc. The primary airframe structural elements form major components of the aircraft 110, such as a fuselage 120, wings 130, and horizontal and vertical stabilizers 140 and 150. Some of these primary structural elements have properties of an electromagnetic cavity.

Moreover, the fuselage 120 may be treated as a structure having a single cavity (the cabin). The wing 130 and stabilizers 140 and 150 may each be treated as a structure having multiple cavities, where each cavity is bounded by ribs and portions of the spars and skin panels.

Aircraft structures include secondary structural elements such as cabin floors, ceiling panels, walls, etc. The aircraft structures may also include systems elements, such as environmental control system (ECS) ducts, tubes of fuel and hydraulics systems, nacelles and pylons of propulsion systems, etc. Some of these aircraft structures, alone or in combination, have properties of electromagnetic cavities.

A structure having the properties of an electromagnetic cavity may have a cavity that is fully or partially bounded. For example, parallel plates (e.g., floor panels) that are electrically conductive may function as waveguides.

Figure 2:
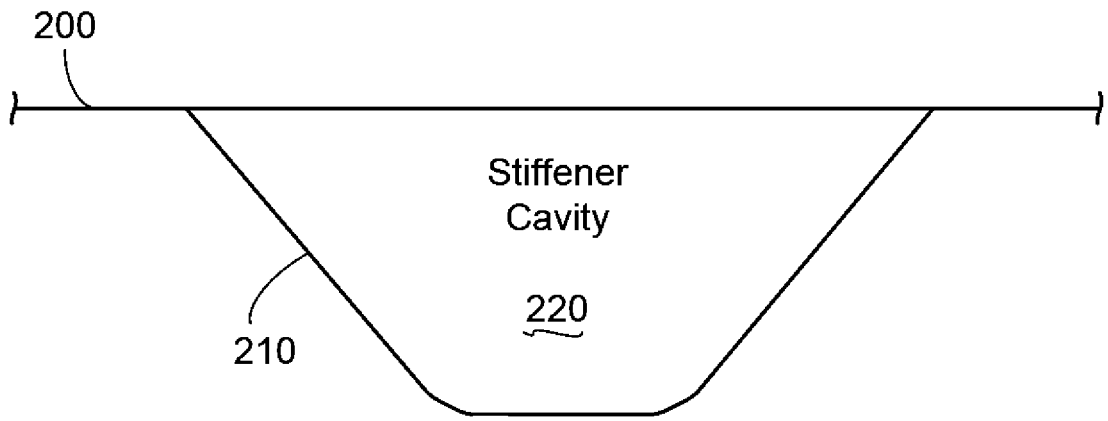
FIG. 2 is an illustration of a cross section of a structural element (a stiffener) of an aircraft.

FIG. 2 illustrates a portion of a fuselage stiffener 210 against the skin 200 of an aircraft. The stiffener 210 and skin 200 form a cavity 220. The stiffener 210 may be made of a composite such as carbon fiber reinforced plastic (CFRP), which is electrically conductive at RF frequencies. The stiffener 210 exhibits characteristics of a waveguide or a cavity resonator. Electromagnetic radiation may be propagated from end-to-end of the stiffener 210 in a propagating fundamental waveguide mode or as in a higher order cavity resonator mode. Thus, if a signal is supplied to one end of the stiffener 210, it will be propagated to the other end of the stiffener 210. Likewise, if a signal is introduced to a non-waveguide structure that still has characteristics of an electromagnetic cavity, it will propagate to other regions of the cavity at higher order cavity modes that are supported.

Figure 3:
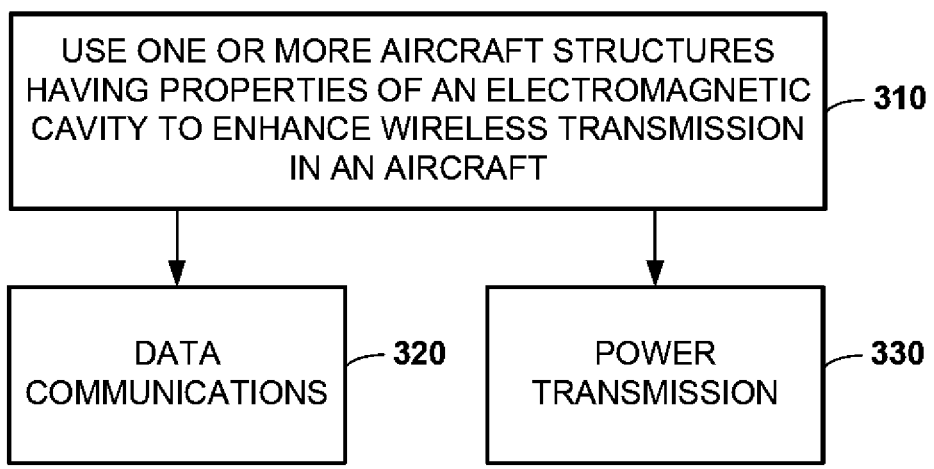
FIG. 3 is an illustration of a method in accordance with an embodiment of the present invention.

Additional reference is made to FIG. 3. One or more aircraft structures having properties of an electromagnetic cavity are used to enhance wireless transmission in an aircraft (block 310). These structures function as waveguides and/or cavity resonators to direct RF signals along pathways within the aircraft. Such a cavity-assisted RF pathway is referred to as a "wireless bus."

One or more of these structures may be used to enhance wireless data communication (block 320). When a wireless system transmits a signal within a cavity of a structure forming a wireless bus, the signal is propagated along a pathway. Specifics of the data communication might depend on the protocol, modulation schemes and sensitivities of the wireless system. Advantages of enhancing the wireless data communication include lower operating power, higher data rates, and increased range. Operating inside a cavity allows more of the radiated energy to be collected at the receiving element, which makes the wireless system more efficient. This increased efficiency, in turn, allows the wireless system to operated at lower power, higher data rates, or further distances (these are all trade-offs).

Isolation is also better because the structures provide shielding from the ambient environment. Better isolation means fewer disruptions in a wireless communication link. In addition, shielding and general lower power requirements should make it easier to go through the regulatory process (e.g., FAA certification).

One or more of these structures may be used to enhance wireless power transmission (block 330). One or more RF power sources are used to completely energize a wireless bus. Energy pumped into a cavity follows a pathway. The antenna of a wireless device can collect the energy and store the energy in a capacitor. The wireless bus can feed energy to harvesting devices that would otherwise receive their energy from ambient and less reliable sources such as vibration, thermal and solar. The wireless bus allows for a controlled power source to feed the devices, which might be more reliable than energy harvesting devices which rely on the ambient environment. The result may be improved energy gathering capability and consistency.

Energy harvesting allows sensor batteries to be eliminated. Thus, battery maintenance is also eliminated.

Data communications and power transmission can be enhanced by the same wireless bus. A wireless bus may operate at one or more specific frequencies for power transmission and it may operate at the same or different frequencies for enhanced data communication. That is, a single wireless bus may have designated power channels and data channels. By properly considering communications protocol and operating frequencies multiple systems can coexist in a wireless bus.

Figure 4:
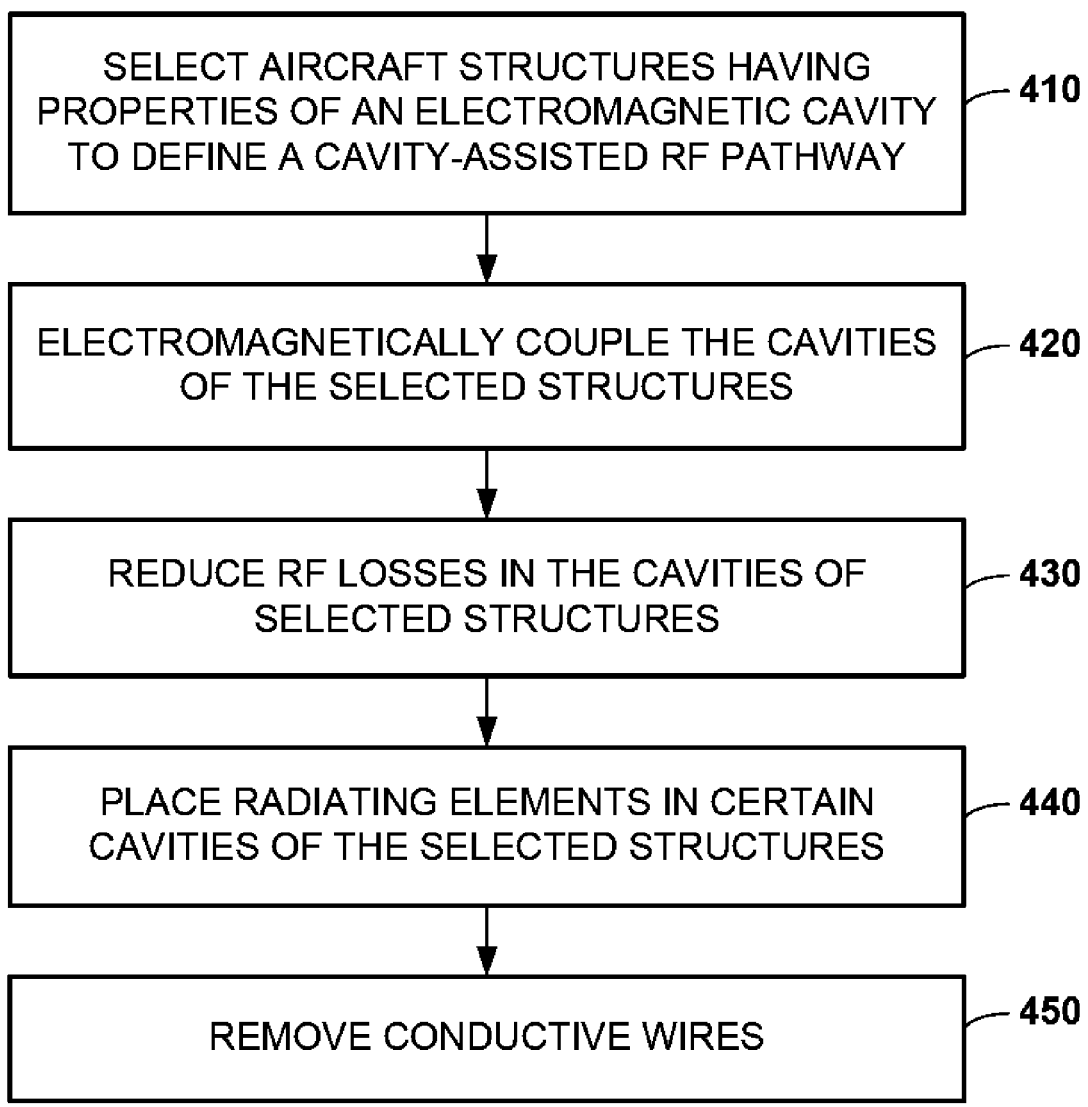
FIG. 4 is an illustration of a method of retrofitting aircraft systems in accordance with an embodiment of the present invention.

Reference is now made to FIG. 4, which illustrates a method of forming a wireless bus in an existing aircraft (that is, FIG. 4 illustrates a retrofit method). At block 410, aircraft structures having properties of an electromagnetic cavity are selected to define a cavity-assisted RF pathway.

At block 420, the cavities of selected structures are electromagnetically coupled. Some of the selected structures might be separated by structures that do not have properties of electromagnetic cavities. For example, some selected structures might be separated by bulkheads, ribs, spars, and any other conducting wall that does not allow a signal to penetrate.

In some instances, the cavities could be electromagnetically coupled by an aperture in the walls of adjacent structures. In other instances, antennas could be used. A variety of antennas can be designed and configured to allow for RF signal or power to be coupled from one isolated cavity to another.

Figure 5:
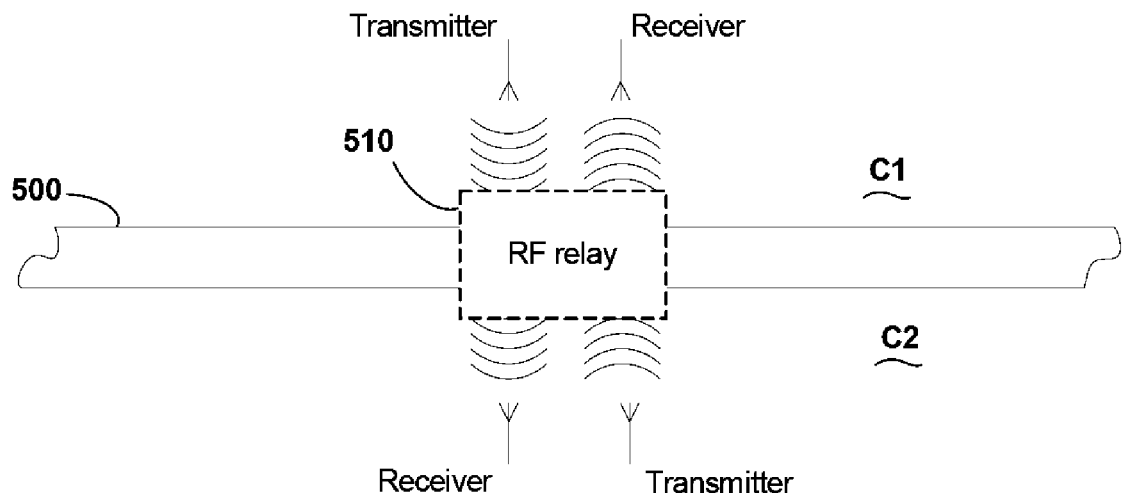
FIG. 5 is an illustration of a relay for electromagnetically coupling the cavities of two structures in accordance with an embodiment of the present invention.

Reference is now made to FIG. 5. In still other instances, a relay 510 may be used to capture energy from one cavity C1 and re-radiate it through a conductive structural element 500 to another cavity C2. A relay 510 allows for transmission of the signal that would otherwise be limited due to obstruction or inadequate power. A relay 510 may be integrated with the structural element 500, integrated with fastening and joining elements, etc.

The relay 510 may be a passive relay. A passive relay may include a dielectric layer on the conducting structural element 500, and a copper trace on the dielectric. The copper trace functions as an antenna. Passive relays are mounted to or formed on opposite sides of the conductive structural element 500. Ports of both relays are tied together through a hole in the structural element. If one side of the structural element is illuminated at a certain frequency, energy will re-radiate on the other side.

The relay 510 may be an active relay that is mounted in the cavity C1 that is not isolated from an RF source. The active relay may include a small transceiver that runs off its own power through a battery or an ambient energy harvester or off RF power fed through the wireless bus. A transmit antenna may extend through the structural element 500 to the cavity C2 that is isolated from the RF source. During operation, the transceiver receives a signal in the one cavity C1, and transmits the signal in the other cavity C2. The active relay enables weak signals to be amplified along the wireless bus. The active relay can also provide up and down conversion capability to optimize propagation in cavities of different sizes. For instance, a 6 GHz signal may propagate efficiently in a first branch of the wireless bus, but is down converted to 900 MHz to propagate efficiently in another branch having different propagation characteristics.

Reference is once again made to FIG. 4. At block 430, RF losses in the selected aircraft structures may be reduced. Losses could be reduced by minimizing leakage points along the cavity walls such as access panels and fastener holes, and latches. RF absorption losses due to wire coupling can be reduced by selecting cavities that do not contain RF-absorbing components.

Other ways of reducing RF loss include, but are not limited to, adding thin layers of CFRP on I-beams to enclose an otherwise open member, thereby forming a waveguide, and inserting "tubes" in floor panels with thin layers of foil.

Conductivity of a cavity can be increased by coating inner cavity walls with conductive paint. The conductive paint reduces the absorption of energy by the walls, thereby improving signal propagation. Conductive paint could also be applied to any elements inside the cavity that are known to absorb RF energy.

At block 440, radiating elements of wireless devices are placed in certain cavities of the selected structures that form the wireless bus. Also placed in these cavities are radiating elements of the devices that energize the wireless bus for power transmission. The radiating elements can be inserted into the bus at arbitrary locations, allowing the redistribution of RF power and communication signals to remote areas.

Additional steps may be performed during a retrofit. Wired systems may be replaced by wireless systems. For instance, conductive wires associated with those wired systems can be removed (block 450).

Reference is once again made to FIG. 1, which also illustrates some exemplary wireless buses B1-B7 in the aircraft 110. A first wireless bus B1 goes from wireless equipment 160a on a wing tip, through a trailing edge of the wing 130, to a communication hub 170a. A second wireless bus B2 goes from wireless equipment 160b on the vertical stabilizer 150, through a stabilizer leading edge and fuselage stiffeners, to the communication hub 170a. A third wireless bus B3 goes from wireless equipment 160c in the aft portion of the fuselage 120, through other fuselage stiffeners, to the communication hub 170a. A fourth wireless bus B4 goes from wireless equipment 160d in a fuel tank to a second hub 170b. A fifth wireless bus B5 goes to wireless equipment 160e in a wheel well to the second hub 170b. A sixth wireless bus B6 is formed by an ECS duct and communicates with the third communications hub 170c. A seventh wireless bus B7 is formed by the leading edge of a wing 130, engine mount pylon and nacelle, and extends between wireless equipment 160f mounted on an engine and the second hub 170b. The communications hubs, 170a, 170b and 170c include radiating elements inserted in the wireless buses, which may be hard-wired to computerized control units in an electrical equipment (EE) Bay 180. The EE bay 180 is typically a centralized location in the aircraft (typically in the front or aft of the aircraft). For some aircraft, however, the EE bay 180 may be decentralized.

A designer has wide latitude to select the paths taken by the wireless buses B1-B7 as well as the structures that form the wireless buses B1-B7. For example, the fifth wireless bus B5 could be formed by starting out in a floor panel, then coupling into a floor beam through a passive relay, then coupling to an open cavity via a wing-to-body fairing, and finally terminating at the wheel well. Such a wireless bus B5 might include a combination of waveguides and cavity resonators.

Reference is made to FIG. 6. The use of aircraft structures as waveguides and cavity resonators enables a wide range of systems to be added to an aircraft without adding significant weight (e.g., due to copper wires and the associated wire shielding) and without increasing installation time and maintenance. For example, an aircraft system 610 includes a plurality of distributed electrical systems. A first distributed electrical system includes electrical components 622a and 622b, which are in different locations. Similarly, a second distributed electrical system includes electrical components 624a and 624b, which are in different locations; and a third distributed electrical system includes electrical components 626a and 626b, which are in different locations. For example, as shown in FIG. 6, components 622a, 624a and 626a may be located in an EE bay 620 of an aircraft, and components 622b, 624b and 626b may be outside the EE bay 620.

Radiating elements 628 and 630 are provided to enable wireless data communication or wireless power transmission, or both, by each electrical system. First, second and third wireless buses 632, 634 and 636 are provided to enhance the wireless data communication and power transmission. The radiating elements 628 and 630 are shown as being within cavities of structures that comprise their wireless buses 632, 634 and 636. Each electrical system may also include wired devices for connecting to its wireless bus.

The third wireless bus 636 is physically isolated from the other two buses 632 and 634. Physical isolation might be desirable if the third electrical system (components 626a and 626b) is a flight-critical system or a system that handles secure data. The third electrical system may be physically isolated through shielding characteristics of the separate wireless buses. Additional isolation could be achieved by frequency management, modulation scheme, communications protocol, duty cycle management, etc.

The first and second wireless buses 632 and 634 are electromagnetically coupled (as represented by the loop 638). The coupling 638 may be implemented by active or passive relays or by structural elements having properties of an electromagnetic cavity. Even though the first and second buses 632 and 634 are coupled, the first and second electrical systems may be isolated from one another by frequency management, modulation scheme, communications protocol, duty cycle management, etc. However, since the first and second buses 632 and 634 are coupled, their components can communicate with each other via cavity assisted pathways. For instance, components 624a and 622b can communicate with each other via a cavity-assisted RF pathway. Advantages of coupling the buses 632 and 634 include alternative pathways for redundancy and on-the-fly communication quality improvements.

FIG. 6 shows a plurality of wireless buses. In some aircraft, however, wireless data communication and power transmission may be enhanced by a single wireless bus.

Each distributed electrical system may include one or more of the following: wireless sensor networks, wireless on-board systems, and wireless personal electronic devices. The wireless sensor networks may include a plurality of wireless sensors distributed through the aircraft. Exemplary sensors include, but are not limited to, pressure and temperature sensors, accelerometers, position sensors, current and voltage sensors, electric and magnetic field sensors, strain sensors, chemical and particulate sensors, light sensors, acoustic sensors, etc. In some embodiments, the sensors can harvest energy from the ambient sources. In other embodiments the sensors can be powered through the wireless bus. In yet other embodiments, the sensors could be powered with batteries or traditional power transmission lines.

The on-board systems may include a wireless in-flight-entertainment system (IFE) or any other system that is currently wired but could eventually go wireless. Such on-board systems could include health monitoring systems, flight controls or any systems that report telemetry or receive commands for actuation.

The personal electronic devices (PEDs) may include, without limitation, cell phones, laptops with wireless networking, personal digital assistants, Bluetooth headsets, etc. These PEDs may be directly or indirectly coupled to a wireless bus. An example of a directly coupled PED may be one that propagates low-powered signals from a passenger PED to a main hub at a large distance through an optimized cabin. An example of an indirectly coupled PED may be one where the cabin does not enhance the propagation, but a nearby secondary hub couples the PED signal through other wireless buses, such as a stiffener or an ECS duct, to a control unit.

The present invention is not limited to retrofitting existing aircraft. Some embodiments of the present invention may be used to create a wireless bus in an aircraft during the aircraft's design phase.

Figure 7:
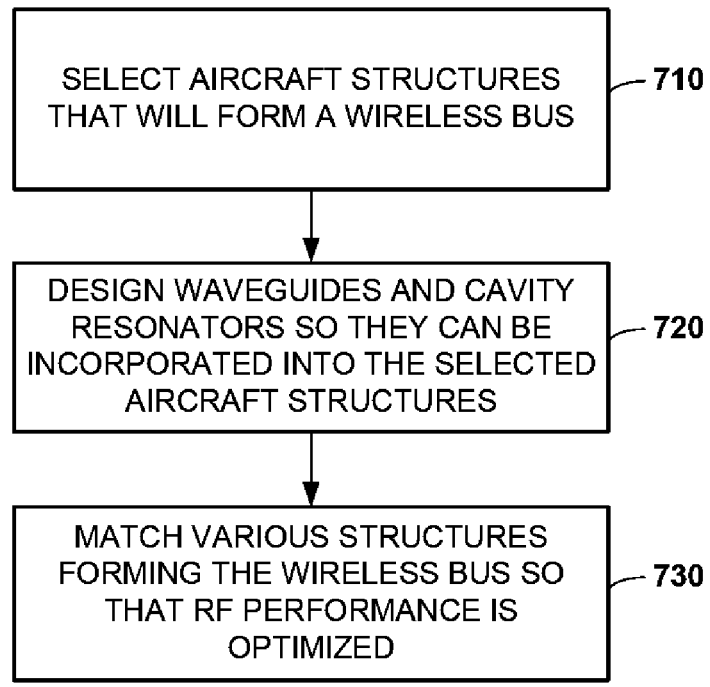
FIG. 7 is an illustration of a method of designing aircraft with an integrated wireless bus in accordance with an embodiment of the present invention.

Reference is made to FIG. 7, which illustrates a method of creating a wireless bus in an aircraft during the aircraft's design phase. At bock 710, a designer selects aircraft structures that will comprise the wireless bus. Additional design requirements may be levied on primary airframe structures, secondary structures and systems to create the wireless bus. Such requirements may include geometry, material and processes that are integrated with the other design disciplines and activities to enable the wireless bus.

At block 720, optimized waveguides and cavity resonators are designed so they can be incorporated into the selected structures. At block 730, the various structures of a wireless bus are properly matched so that RF performance is optimized. For instance, a true rectangular waveguide of certain inner dimensions could be designed so it is embedded in a wing spar. In an ECS system, ducts could be slightly larger or smaller to accommodate certain frequencies and a thin conducting foil may be added to the inner surface of the duct.

An embodiment of the present invention is not limited to aircraft. Embodiments of the present invention can be applied to any other system having structures with properties of electromagnetic cavities. Examples of systems include ships and submarines, rockets, automobiles, trains, and other vehicles. Other examples include, without limitation, satellites and buildings.

The invention claimed is:

1. A method comprising using an aircraft component having properties of an electromagnetic cavity to propagate wireless transmissions inside the component along a length of the component, the component formed by a plurality of airframe structural elements.

2. The method of claim 1, wherein the aircraft component is caused to function as at least one of an RF waveguide and an RF cavity resonator.

3. The method of claim 1, wherein the wireless transmissions include data communication.

4. The method of claim 1, wherein the aircraft component is one of a fuselage, wing and stabilizer.

5. The method of claim 1, wherein the airframe structural elements include at least one of a stiffener, frame, rib, beam, stringer, spar, leading edge, trailing edge, and control surface.

6. The method of claim 1, wherein the wireless transmissions include wireless power transmission.

7. A method for an aircraft, the method comprising electromagnetically coupling selected aircraft structures having properties of an electromagnetic cavity to form a wireless bus.

8. The method of claim 7, wherein a relay is used to electromagnetically couple two of the selected aircraft structures.

9. The method of claim 7, further comprising reducing RF losses in the aircraft structures.

10. The method of claim 7, further comprising adding means for energizing cavities of certain selected structures for power transmission.

11. The method of claim 7, further comprising connecting the wireless bus to a hub through a radiating element.

12. The method of claim 7, further comprising installing a plurality of wireless devices in the aircraft, the devices having their radiating elements installed inside cavities of certain selected structures.

13. The method of claim 12, wherein the wireless devices replace wired devices, and wherein the method further comprises removing wires for the wired devices.

14. An aircraft comprising:
a plurality of aircraft structures having properties of an electromagnetic cavity, the structures forming at least one cavity-assisted RF pathway within the aircraft;
a plurality of wireless electrical systems having their radiating elements within cavities of certain of the structures, the certain structures used to enhance wireless transmission by the systems.

15. The aircraft of claim 14, wherein the aircraft structures include airframe structural elements.

16. The aircraft of claim 14, wherein the aircraft structures include systems components.

17. The aircraft of claim 14, wherein cavities of the structures are RF-coupled to form a plurality of different paths.

18. The aircraft of claim 17, further comprising a hub for the plurality of paths.

19. The aircraft of claim 14, further comprising conductive materials on the structures for reducing RF losses.

20. The aircraft of claim 14, further comprising relays for electromagnetically coupling the cavities of the structures.

21. A method of designing the aircraft of claim 14, the method comprising:
selecting aircraft structures to form a cavity-assisted RF pathway;
designing waveguides and cavity resonators so they can be incorporated into the selected structures; and
matching the structures so that RF performance is optimized.

22. A method for an aircraft including an elongated composite beam having first and second ends, the beam having a cavity that extends from the first end to the second end, the method comprising radiating a signal at the first end of the beam and causing the beam to function as at least one of an RF waveguide and an RF cavity resonator to propagate the signal to the second end.

23. The method of claim 22, wherein the beam is a stiffener.

* * * * *